(12) United States Patent
Hsu et al.

(10) Patent No.: US 8,515,379 B2
(45) Date of Patent: Aug. 20, 2013

(54) RECEIVER CAPABLE OF REDUCING LOCAL OSCILLATION LEAKAGE AND IN-PHASE/QUADRATURE-PHASE (I/Q) MISMATCH AND AN ADJUSTING METHOD THEREOF

(75) Inventors: Hong-Ta Hsu, Hsinchu (TW); Ying-Hsi Lin, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 95 days.

(21) Appl. No.: 13/174,975

(22) Filed: Jul. 1, 2011

(65) Prior Publication Data

US 2011/0261911 A1 Oct. 27, 2011

Related U.S. Application Data

(62) Division of application No. 12/286,107, filed on Sep. 25, 2008, now Pat. No. 8,280,327.

(30) Foreign Application Priority Data

Sep. 27, 2007 (TW) ................................ 96135951 A (51) Int. Cl.
*H04B 1/10* (2006.01)
(52) U.S. Cl.
USPC .......... 455/296; 455/501; 455/63.1; 455/130; 455/208; 375/346; 375/348; 375/351; 375/316
(58) Field of Classification Search
USPC ............. 455/67.11, 67.14, 138, 226.1, 232.1, 455/130, 141, 147, 208, 209, 255, 570, 296, 455/278.1, 501, 63.1; 375/346, 348, 351, 375/316
See application file for complete search history.

(56) References Cited

U.S. PATENT DOCUMENTS

| | | | |
|---|---|---|---|
| 6,009,317 A * | 12/1999 | Wynn | 455/296 |
| 6,970,689 B2 | 11/2005 | Khorram | |
| 7,876,867 B2 * | 1/2011 | Filipovic et al. | 375/346 |
| 7,925,217 B2 * | 4/2011 | Park et al. | 455/67.11 |
| 2003/0157902 A1 | 8/2003 | Khorram | |
| 2005/0260949 A1 | 11/2005 | Kiss et al. | |
| 2007/0001996 A1 * | 1/2007 | Heo | 345/102 |
| 2007/0025433 A1 | 2/2007 | Hammerschmidt et al. | |
| 2007/0047672 A1 * | 3/2007 | Kim | 375/329 |

OTHER PUBLICATIONS

Lee, C., et al., "A Highly Linear Dircet Conversion Transmit Mixer Transconductance Stage with Local Oscillation Feedthrough and I/Q Imbalance Cancellation Scheme", Solid State Circuits, 2006 IEEE International Conference Digest of Technical Papers (San Francisco), pp. 1450-1459, Feb. 6-9, 2006.

* cited by examiner

*Primary Examiner* — Tuan Pham
(74) *Attorney, Agent, or Firm* — McClure, Qualey & Rodack, LLP (57) ABSTRACT

An adjusting method for reducing local oscillation leakage or I/Q mismatch in a receiver includes the steps of: (a) detecting a current extent of local oscillation leakage or I/Q mismatch; (b) determining if an adjusting direction is correct with reference to the current extent of local oscillation leakage or I/Q mismatch thus detected, maintaining the adjusting direction if correct, and reversing the adjusting direction upon determining that the adjusting direction is incorrect; and (c) adjusting a control signal according to the adjusting direction.

7 Claims, 6 Drawing Sheets

RECEIVER CAPABLE OF REDUCING LOCAL OSCILLATION LEAKAGE AND IN-PHASE/QUADRATURE-PHASE (I/Q) MISMATCH AND AN ADJUSTING METHOD THEREOF

CROSS-REFERENCE TO RELATED APPLICATION

The present invention is a division of U.S. application Ser. No. 12/286,107, filed Sep. 25, 2008, which claims priority to Taiwan Application No. 096135951, filed on Sep. 27, 2007.

BACKGROUND OF THE INVENTION

1. Field of the Invention

The invention relates to a receiver and an adjusting method thereof, more particularly to a receiver capable of reducing local oscillation leakage and in-phase/quadrature-phase (I/Q) mismatch, and an adjusting method thereof.

2. Description of the Related Art

Figure 1:
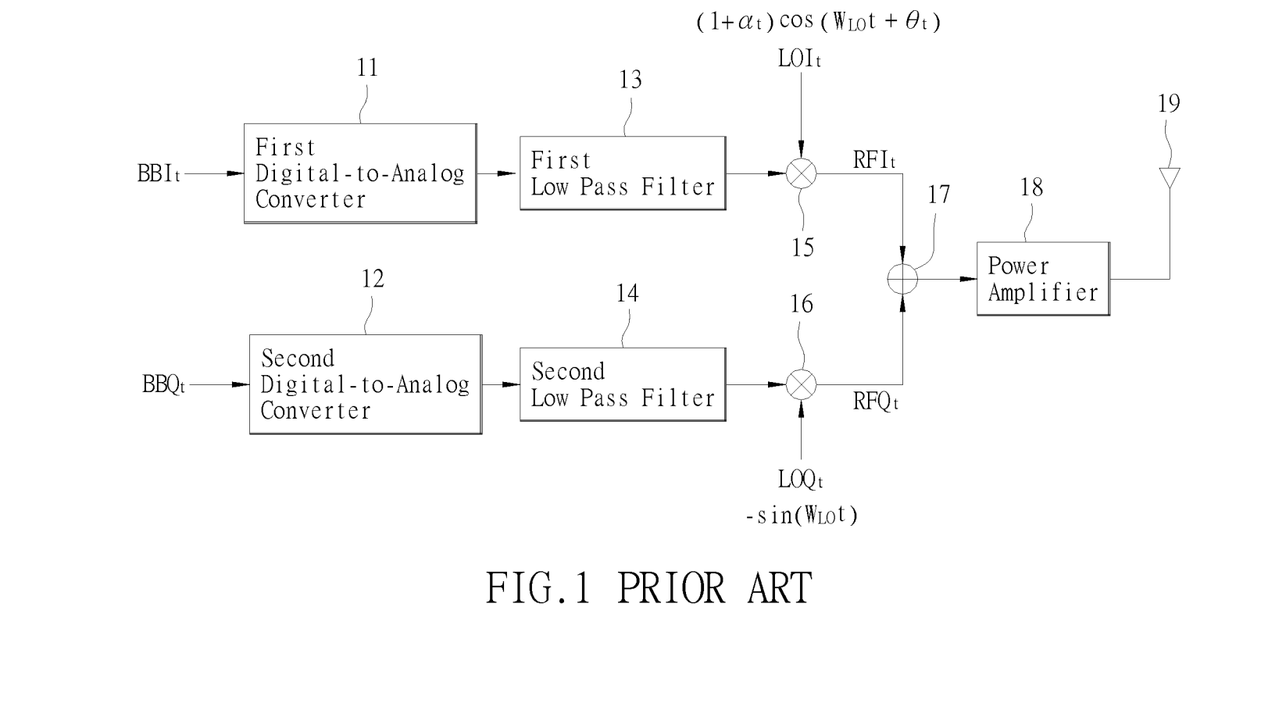
FIG. 1 is a block diagram of a first conventional transmitter.

As shown in FIG. 1, a first conventional direct up-conversion transmitter includes first and second digital-to-analog converters 11, 12, first and second low-pass filters 13, 14, first and second mixers 15, 16, an adder 17, a power amplifier 18, and an antenna 19. A digital base band signal ($BBI_t$) undergoes in sequence digital-to-analog conversion by the first digital-to-analog converter 11, low-pass filtering by the first low-pass filter 13, and mixing with an in-phase local oscillator signal ($LOI_t$) by the first mixer 15 so as to generate an analog in-phase radio frequency signal ($RFI_t$). Another digital base band signal ($BBQ_t$) undergoes in sequence digital-to-analog conversion by the second digital-to-analog converter 12, low-pass filtering by the second low-pass filter 14, and mixing with a quadrature-phase local oscillator signal ($LOQ_t$) by the second mixer 16 so as to generate an analog quadrature-phase radio frequency signal ($RFQ_t$). The analog in-phase radio frequency signal ($RFI_t$) and the analog quadrature-phase radio frequency signal ($RFQ_t$) are combined by the adder 17, the result of which is amplified by the power amplifier 18 for subsequent transmission via the antenna 19.

Although the ideal phase difference between the in-phase local oscillator signal ($LOI_t$) and the quadrature-phase local oscillator signal ($LOQ_t$) is 90 degrees, a phase offset ($\theta_t$) exists in practice. In addition, a gain offset (represented by an amplitude offset ($\alpha_t$) in FIG. 1) exists between the in-phase component blocks (including the first digital-to-analog converter 11 and the first low-pass filter 13) and the quadrature-phase component blocks (including the second digital-to-analog converter 12 and the second low-pass filter 14). This phenomenon is referred to as in-phase/quadrature-phase (I/Q) mismatch or in-phase/quadrature-phase (I/Q) imbalance. Moreover, it is possible for the in-phase local oscillator signal ($LOI_t$) and the quadrature-phase local oscillator signal ($LOQ_t$) to respectively leak into the analog in-phase radio frequency signal ($RFI_t$) and the analog quadrature-phase radio frequency signal ($RFQ_t$) through the first and second mixers 15, 16, respectively. This phenomenon is called local oscillation leakage or local oscillation feedthrough. The abovementioned I/Q mismatch and local oscillation leakage reduce signal-to-noise ratio of signals transmitted by the first conventional direct up-conversion transmitter, and eventually result in loss of data.

Figure 2:
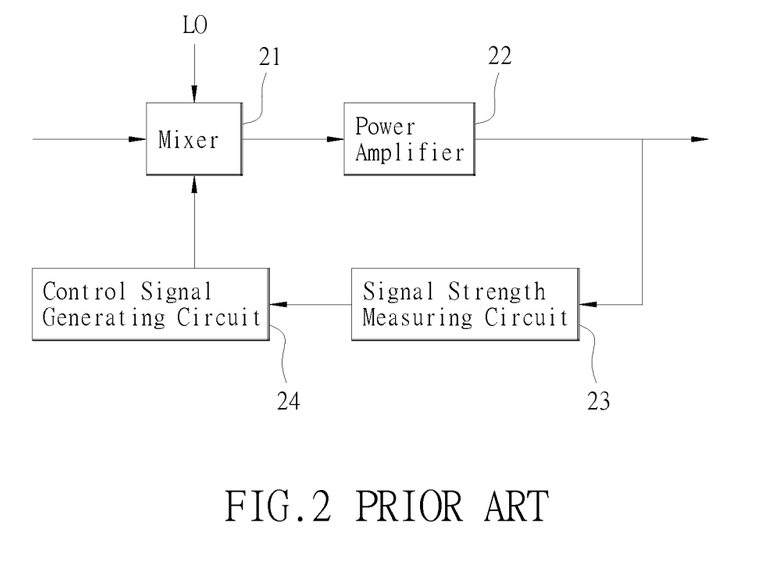
FIG. 2 is a block diagram of a second conventional transmitter.

As shown in FIG. 2, U.S. Pat. No. 6,970,689 discloses a second conventional transmitter capable of reducing local oscillation leakage. The second conventional transmitter includes a mixer 21, a power amplifier 22, a signal strength measuring circuit 23, and a control signal generating circuit 24. The mixer 21 is operable in a plurality of operating states that respectively correspond to various extents of local oscillation leakage. The signal strength measuring circuit 23 is used for measuring signal strength of a local oscillation leakage component of an output signal outputted by the power amplifier 22. The signal strength measuring circuit 23 includes a rectifier (not shown) and a comparator (not shown). The control signal generating circuit 24 outputs a control signal to control the operating state of the mixer 21 according to output of the signal strength measuring circuit 23.

During calibration of the mixer 21, for each possible operating state of the mixer 21, the power amplifier 22 operates at a higher gain level, and the control signal generating circuit 24 stores information related to the operating state and the corresponding signal strength measured by the signal strength measuring circuit 23. To complete the calibration process, the operating state corresponding to the lowest extent of local oscillation leakage is selected as a current operating state for the mixer 21.

Alternatively, during calibration of the mixer 21, the power amplifier 22 operates at a higher gain level, and the control signal generating circuit 24 changes the current operating state of the mixer 21 in succession, until the corresponding signal strength measured by the signal strength measuring circuit 23 is smaller than a preset threshold value, at which time the current operating state of the mixer 21 is fixed.

Figure 3:
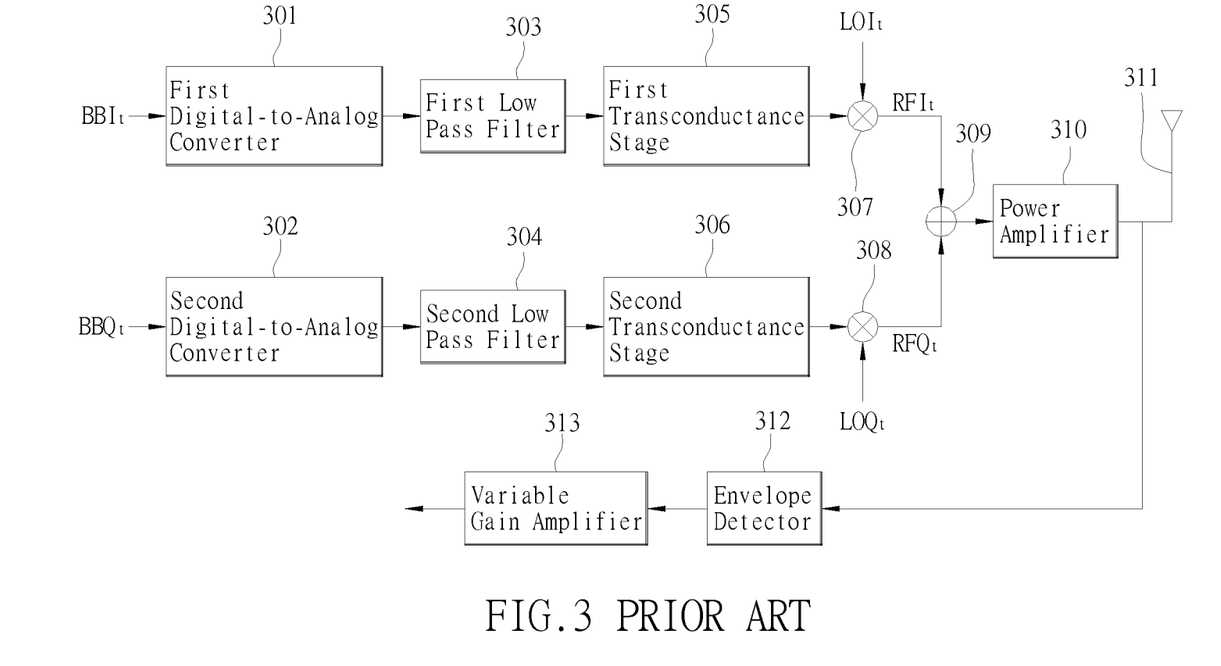
FIG. 3 is a block diagram of a third conventional transmitter.

FIG. 3 illustrates a third conventional transmitter capable of reducing local oscillation leakage and I/Q mismatch as disclosed by C. Lee et al., "A Highly Linear Direct-Conversion Transmit Mixer Transconductance Stage with Local Oscillation Feedthrough and I/Q Imbalance Cancellation Scheme", *Solid-State Circuits*, 2006 IEEE International Conference Digest of Technical Papers (San Francisco, U.S.A.), pp. 1450-1459, Feb. 6-9, 2006. The third conventional transmitter includes first and second digital-to-analog converters 301, 302, first and second low-pass filters 303, 304, first and second transconductance stages 305, 306, first and second mixers 307, 308, an adder 309, a power amplifier 310, an antenna 311, an envelope detector 312, and a variable gain amplifier 313. First and second digital base band signals ($BBI_t$), ($BBQ_t$) are respectively converted into first and second analog radio frequency signals ($RFI_t$), ($RFQ_t$), which are combined and amplified for subsequent transmission.

The envelope detector 312 and the variable gain amplifier 313 sequentially perform envelope detection and amplification upon an output signal of the power amplifier 310 so as to generate a base band ripple. When the first and second digital base band signals ($BBI_t$), ($BBQ_t$) are sinusoidal signals with frequencies of ($F_{BB}$), spectral components of the base band ripple appear at ($F_{BB}$) (due to local oscillation leakage) and ($2 \times F_{BB}$) (due to I/Q mismatch). Therefore, spectral analysis of the base band ripple reveals the extents of local oscillation leakage and I/Q mismatch.

Local oscillation leakage can be categorized into base band local oscillation leakage and radio frequency local oscillation leakage. Base band local oscillation leakage is attributed to device offsets among the first and second digital-to-analog converters 301, 302, the first and second low-pass filters 303, 304, and the first and second transconductance stages 305, 306. As for radio frequency local oscillation leakage, it arises as a result of direct coupling due to parasitic capacitance or mutual inductance. Reductions of these two different types of local oscillation leakage need to be conducted independently.

It is noted that the article by C. Lee et al. does not disclose how to adjust the first and second transconductance stages 305, 306 and the phase and amplitude of the first and second digital base band signals ($BBI_t$), ($BBQ_t$) for reducing local oscillation leakage and I/Q mismatch of a transmitter. Neither does the article mention how to reduce local oscillation leakage and I/Q mismatch of a receiver.

SUMMARY OF THE INVENTION

Therefore, an object of the present invention is to provide an adjusting method for reducing local oscillation leakage or in-phase/quadrature-phase (I/Q) mismatch in a receiver.

According to one aspect of the present invention, there is provided an adjusting method for reducing local oscillation leakage or I/Q mismatch in a receiver. The adjusting method includes the steps of: (a) detecting a current extent of local oscillation leakage or I/Q mismatch; (b) determining if an adjusting direction is correct with reference to the current extent of local oscillation leakage or I/Q mismatch thus detected, maintaining the adjusting direction if correct, and reversing the adjusting direction upon determining that the adjusting direction is incorrect; and (c) adjusting a control signal according to the adjusting direction.

Another object of the present invention is to provide a receiver capable of reducing local oscillation leakage or I/Q mismatch.

According to still another aspect of the present invention, there is provided a receiver that includes a mixer, a detecting unit, and an adjusting unit. The mixer mixes a radio frequency signal and a local oscillator signal so as to generate a base band signal. The detecting unit generates from the base band signal a detection signal that represents an extent of local oscillation leakage or I/Q mismatch. The adjusting unit is coupled electrically to the mixer for outputting a control signal thereto to control a current operating state of the mixer. The adjusting unit is further coupled electrically to the detecting unit, and determines whether there is a reduction in the extent of local oscillation leakage or I/Q mismatch based on the detection signal from the detecting unit. The adjusting unit maintains an adjusting direction for the control signal upon determining that the extent of local oscillation leakage or I/Q mismatch is reduced, reverses the adjusting direction upon determining that the extent of local oscillation leakage or I/Q mismatch is not reduced, and adjusts the control signal according to the adjusting direction.

Yet another aspect of the present invention is to provide a receiver capable of reducing in-phase/quadrature-phase (I/Q) mismatch.

According to still a further aspect of the present invention, there is provided a receiver that includes first and second mixers, first and second low pass filters, first and second analog-to-digital converters, a compensating unit, a detecting unit, and an adjusting unit. The first mixer mixes a radio frequency signal with an in-phase local oscillator signal so as to generate a first initial base band signal. The second mixer mixes the radio frequency signal with a quadrature-phase local oscillator signal so as to generate a second initial base band signal. The first and second low pass filters are coupled electrically and respectively to the first and second mixers for performing low pass filtering respectively upon the first and second initial base band signals. The first and second analog-to-digital converters are coupled electrically and respectively to the first and second low pass filters for converting outputs of the first and second low pass filters into corresponding first and second base band signals, respectively. The compensating unit is coupled electrically to the first and second analog-to-digital converters for performing phase and amplitude compensation upon the first and second base band signals so as to generate first and second output signals. The detecting unit is coupled electrically to the compensating unit for generating a detection signal that represents an extent of in-phase/quadrature-phase (I/Q) mismatch from the first and second output signals. The adjusting unit is coupled electrically to the compensating unit for outputting at least one control signal thereto to control a current operating state of the compensating unit. The adjusting unit is further coupled electrically to the detecting unit, and determines whether there is a reduction in the extent of I/Q mismatch based on the detection signal from the detecting unit. The adjusting unit maintains an adjusting direction corresponding to each of the at least one control signal upon determining that the extent of I/Q mismatch is reduced, reverses the adjusting direction corresponding to each of the at least one control signal upon determining that the extent of I/Q mismatch is not reduced, and adjusts each of the at least one control signal according to the adjusting direction corresponding thereto.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
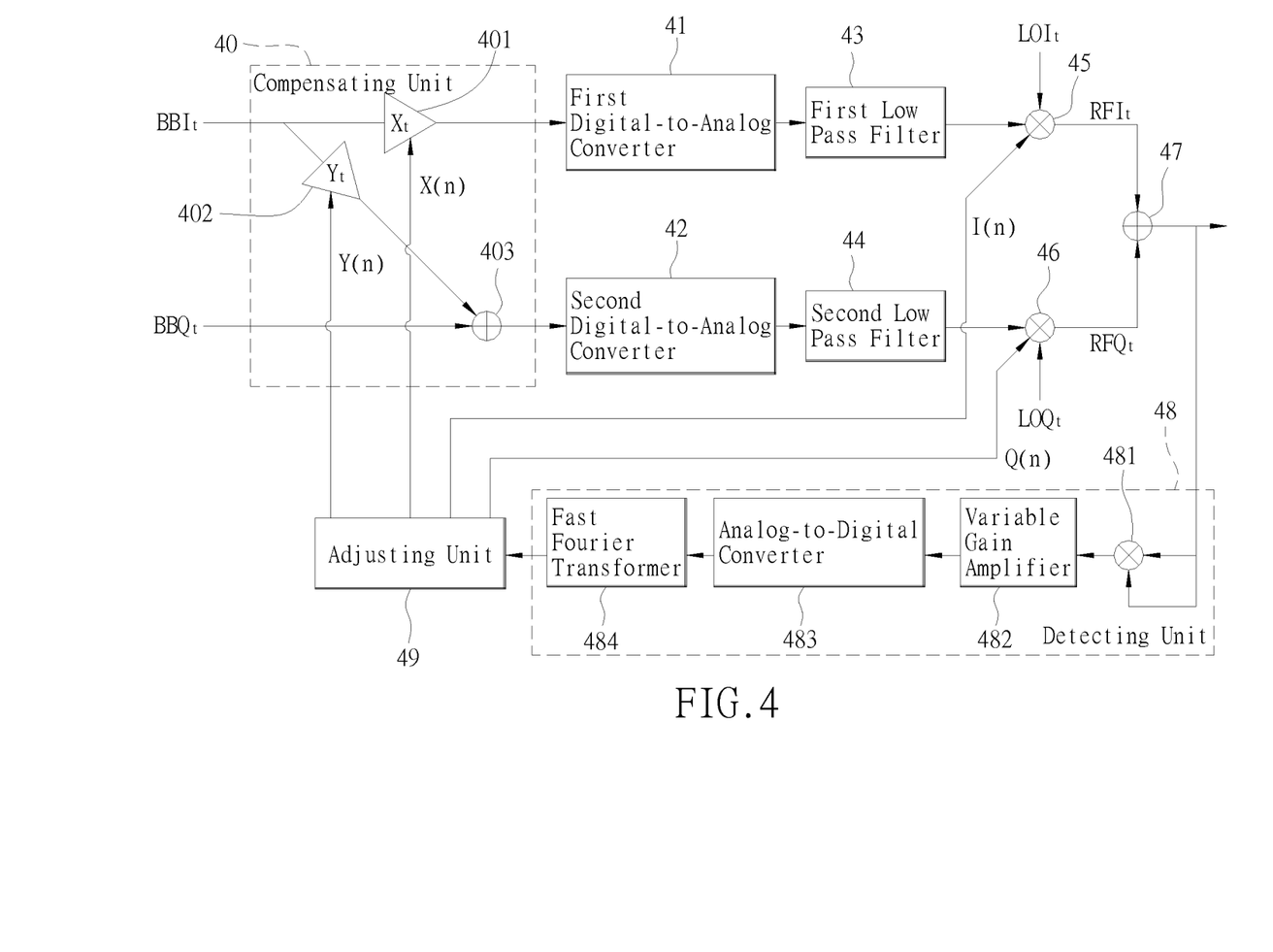
FIG. 4 is a block diagram of the preferred embodiment of a transmitter according to the present invention.

As shown in FIG. 4, the preferred embodiment of a transmitter according to the present invention includes a compensating unit 40, first and second digital-to-analog converters 41, 42, first and second low pass filters 43, 44, first and second mixers 45, 46, a first adder 47, a detecting unit 48, and an adjusting unit 49.

The compensating unit 40 performs phase and amplitude compensation upon first and second base band signals ($BBI_t$, $BBQ_t$) so as to generate first and second output signals. The compensating unit 40 is operable in a plurality of operating states that respectively correspond to a plurality of extents of in-phase/quadrature-phase (I/Q) mismatch. In this embodiment, the compensating unit 40 includes first and second variable gain stages 401, 402, and a second adder 403. The first variable gain stage 401 scales the first base band signal ($BBI_t$) by a first variable ($X_t$) so as to generate the first output signal that is provided to the first digital-to-analog converter 41. The second variable gain stage 402 scales the first base band signal ($BBI_t$) by a second variable ($Y_t$) so as to generate an intermediate signal. The second adder 403 is coupled electrically to the second variable gain stage 402 for receiving the intermediate signal therefrom, and for combining the intermediate signal with the second base band signal ($BBQ_t$) so as to generate the second output signal that is provided to the second digital-to-analog converter 42.

The first and second digital-to-analog converters 41, 42 are coupled electrically to the compensating unit 40 for converting the first and second output signals received from the compensating unit 40 into corresponding first and second analog signals, respectively. In this embodiment, the first and second digital-to-analog converters 41, 42 are coupled electrically and respectively to the first variable gain stage 401 and the second adder 403.

The first and second low pass filters 43, 44 are coupled electrically and respectively to the first and second digital-to-analog converters 41, 42 for performing low pass filtering respectively upon the first and second analog signals.

The first and second mixers 45, 46 are coupled electrically and respectively to the first and second low pass filters 43, 44. The first mixer 45 mixes output of the first low pass filter 43 with an in-phase local oscillator signal ($LOI_t$) so as to generate a first radio frequency signal ($RFI_t$). The second mixer 46 mixes output of the second low pass filter 44 with a quadrature-phase local oscillator signal (LOW so as to generate a second radio frequency signal ($RFQ_t$). Each of the first and second mixers 45, 46 is operable in a plurality of operating states that respectively correspond to a plurality of extents of local oscillation leakage.

The first adder 47 is coupled electrically to the first and second mixers 45, 46 for combining the first and second radio frequency signals ($RFI_t$, $RFQ_t$) into a combined radio frequency signal.

The detecting unit 48 is coupled electrically to the first adder 47, and generates from output of the first adder 47, i.e., the combined radio frequency signal, a detection signal that represents an extent of local oscillation leakage and/or an extent of I/Q mismatch. It is noted that the frequency of the detection signal is within a base band frequency range of the first and second base band signals ($BBI_t$, $BBQ_t$). In this embodiment, the detecting unit 48 includes a third mixer 481, a variable gain amplifier 482, an analog-to-digital converter 483, and a fast Fourier transformer 484. The third mixer 481 receives the combined radio frequency signal from the first adder 47, and mixes the combined radio frequency signal with itself. The variable gain amplifier 482 is coupled electrically between the third mixer 481 and the analog-to-digital converter 483 for amplifying the output of the third mixer 481 prior to receipt by the analog-to-digital converter 483. The analog-to-digital converter 483 converts amplified output of the variable gain amplifier 482 into a corresponding digital signal. The fast Fourier transformer 484 is coupled electrically to the analog-to-digital converter 483 for performing fast Fourier transform upon the digital signal from the analog-to-digital converter 483 so as to generate the detection signal that is provided to the adjusting unit 49.

When the first and second base band signals ($BBI_t$, $BBQ_t$) are sinusoidal signals with frequencies of ($F_{BB}$), the output of the third mixer 481 has spectral components at ($F_{BB}$) (due to local oscillation leakage) and ($2 \times F_{BB}$) (due to I/Q mismatch). In addition, spectral analysis of the output of the third mixer 481 can reveal the extents of local oscillation leakage and I/Q mismatch. It should be noted herein that the variable gain amplifier 482 may be optionally omitted in other embodiments of the present invention. Further, in another embodiment of the present invention, the third mixer 481 may be replaced with an envelope detector (not shown), which receives the combined radio frequency signal from the first adder 47 and which performs envelope detection upon the combined radio frequency signal.

The adjusting unit 49 is coupled electrically to the compensating unit 40 and to the first and second mixers 45, 46 for outputting at least one control signal thereto to control a current operating state of a corresponding one of the compensating unit 40 and the first and second mixers 45, 46. In this embodiment, the adjusting unit 49 outputs first, second, third and fourth control signals I(n), Q(n), X(n), Y(n). The adjusting unit 49 is coupled electrically to the first and second mixers 45, 46 for respectively outputting the first and second control signals I(n), Q(n) to control correspondingly the current operating states of the first and second mixers 45, 46, and is further coupled electrically to the first and second variable gain stages 401, 402 of the compensating unit 40 for respectively outputting the third and fourth control signals X(n), Y(n) to control correspondingly the first and second variables ($X_t$, $Y_t$) so as to control the current operating state of the compensating unit 40.

Figure 5:
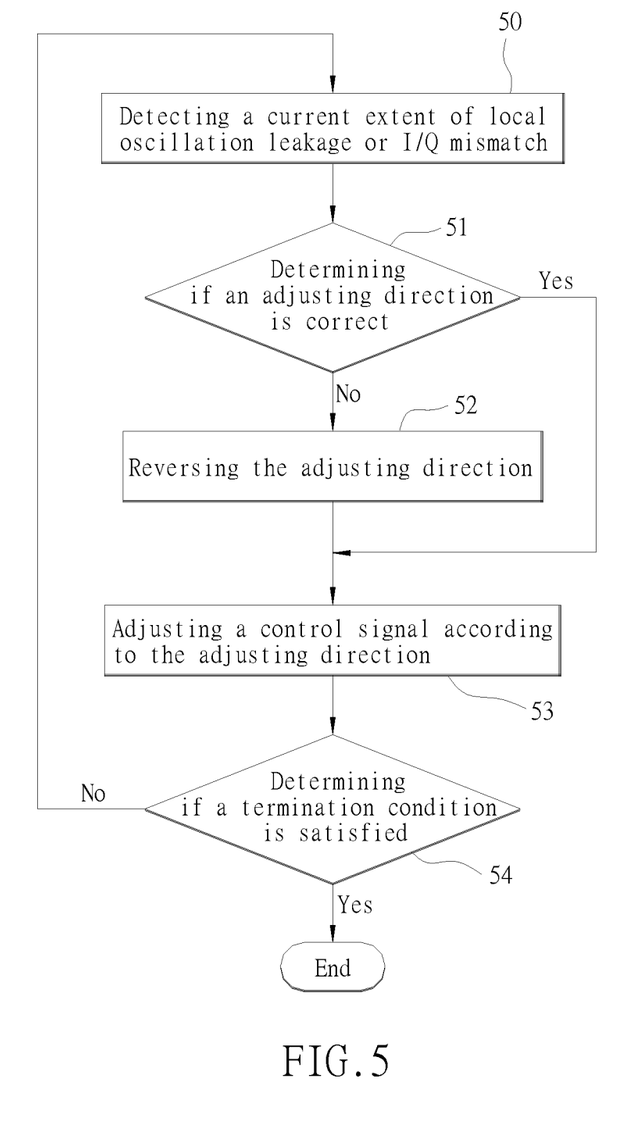
FIG. 5 is a flow chart of an adjusting method for reducing local oscillation leakage and in-phase/quadrature-phase (I/Q) mismatch according to the preferred embodiment.

With further reference to FIG. 5, the method for reducing local oscillation leakage or I/Q mismatch according to the preferred embodiment of the present invention involves the adjustments of corresponding ones of the first to fourth control signals X(n), Y(n), I(n), Q(n). The method includes the following steps.

In step 50, the detecting unit 48 detects one of a current extent of local oscillation leakage and a current extent of I/Q mismatch, and generates a corresponding detection signal that represents the detected current extent of local oscillation leakage or I/Q mismatch.

In step 51, the adjusting unit 49 determines, with reference to the corresponding detection signal, if an adjusting direction corresponding to the detected current extent of local oscillation leakage or I/Q mismatch is correct. If correct, the process jumps to step 53. Otherwise, i.e., upon determining that the adjusting direction is incorrect, the process goes to step 52. In this embodiment, the adjusting direction corresponding to the extent of local oscillation leakage refers to the adjustments made by the adjusting unit 49 to the first and second control signals I(n), Q(n), while the adjusting direction corresponding to the extent of I/Q mismatch refers to the adjustments made by the adjusting unit 49 to the third and fourth control signals X(n), Y(n). Therefore, when the adjusting unit 49 determines that there is a reduction in the extent of local oscillation leakage, i.e., when a current extent of local oscillation leakage is smaller than a previous extent of local oscillation leakage, based on the detection signal from the detecting unit 48, the directions of adjustments made to the first and second control signals I(n), Q(n) are correct. On the other hand, when the adjusting unit 49 determines that there is a reduction in the extent of I/Q mismatch, i.e., when a current extent of I/Q mismatch is smaller than a previous extent of I/Q mismatch, based on the detection signal from the detecting unit 48, the directions of adjustments made to the third and fourth control signals X(n), Y(n) are correct.

In step 52, the adjusting unit 49 reverses the adjusting direction.

In step 53, the adjusting unit 49 adjusts the control signals corresponding to the detected current extent of local oscillation leakage or I/Q mismatch according to the adjusting direction. In this embodiment, each of the first to fourth control signals I(n), Q(n), X(n), Y(n) is adjusted stepwise by the adjusting unit 49.

In addition to the above steps, the method for reducing one of local oscillation leakage and I/Q mismatch according to the preferred embodiment of the present invention may optionally further include the following steps.

In step 54, the adjusting unit 49 further determines if a termination condition is satisfied. If affirmative, the control signals corresponding to the detected current extent of local oscillation leakage or I/Q mismatch are maintained, and the process is terminated. Otherwise, i.e., upon determining that the termination condition is not satisfied, the process goes back to step 50 to repeat the determination as to whether there is a reduction in the detected current extent of local oscillation leakage or I/Q mismatch and the adjustment of the control signals corresponding to the detected current extent of local oscillation leakage or I/Q mismatch. In an embodiment of the present invention, the adjusting unit 49 determines the termination condition to be satisfied when the adjusting unit 49 has repeated the determination as to whether there is a reduction in the detected current extent of local oscillation leakage or I/Q mismatch and the adjustment of the control signals corresponding to the detected current extent of local oscillation leakage or I/Q mismatch for a predefined number of times. In an alternative embodiment of the present invention, the adjusting unit 49 determines the termination condition to be satisfied when the detected current extent of local oscillation leakage or I/Q mismatch is determined thereby to be smaller than a predefined threshold.

According to the present invention, the method for reducing local oscillation leakage and I/Q mismatch can be modified such that steps 50 to 53 are conducted independently for each of the first to fourth control signals I(n), Q(n), X(n), Y(n) prior to conducting step 54.

Figure 6:
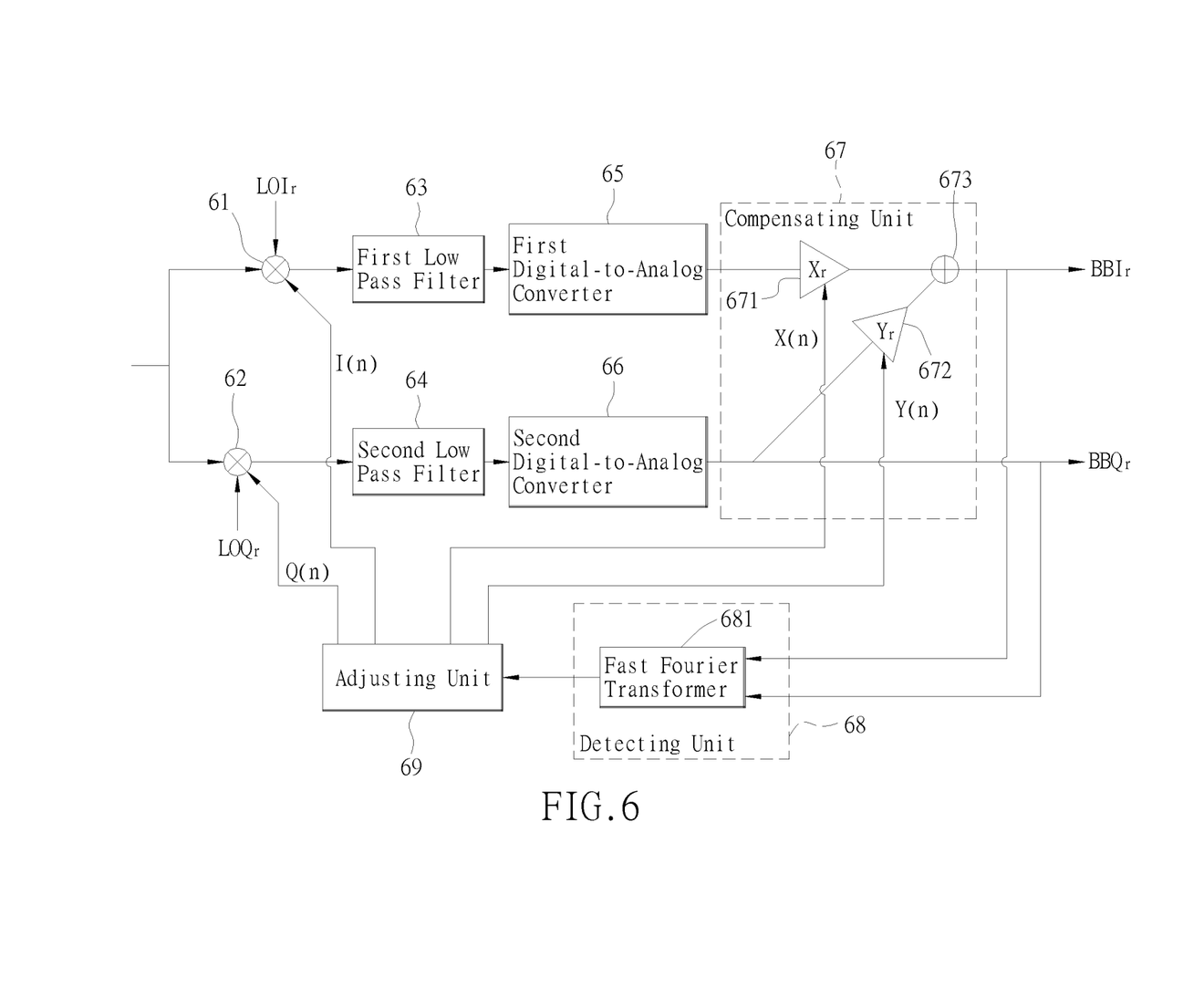
FIG. 6 is a block diagram of the preferred embodiment of a receiver according to the present invention.

In FIG. 6, the preferred embodiment of a receiver according to the present invention includes first and second mixers 61, 62, first and second low pass filters 63, 64, first and second analog-to-digital converters 65, 66, a compensating unit 67, a detecting unit 68, and an adjusting unit 69.

The first mixer 61 mixes an analog radio frequency signal with an in-phase local oscillator signal ($LOI_r$) so as to generate a first initial base band signal. The second mixer 62 mixes the analog radio frequency signal with a quadrature-phase local oscillator signal ($LOQ_r$) so as to generate a second initial base band signal. Each of the first and second mixers 61, 62 is operable in a plurality of operating states that respectively correspond to a plurality of extents of local oscillation leakage.

The first and second low pass filters 63, 64 are coupled electrically and respectively to the first and second mixers 61, 62 for performing low pass filtering respectively upon the first and second initial base band signals.

The first and second analog-to-digital converters 65, 66 are coupled electrically and respectively to the first and second low pass filters 63, 64 for converting outputs of the first and second low pass filters 63, 64 into corresponding first and second base band signals, respectively.

The compensating unit 67 is coupled electrically to the first and second analog-to-digital converters 65, 66 for performing phase and amplitude compensation upon the first and second base band signals so as to generate first and second base band output signals. The compensating unit 67 is operable in a plurality of operating states that respectively correspond to a plurality of extents of I/Q mismatch. In this embodiment, the compensating unit 67 includes first and second variable gain stages 671, 672, and an adder 673. The first variable gain stage 671 scales the first base band signal by a first variable ($X_r$) so as to generate a first intermediate signal. The second variable gain stage 672 scales the second base band signal by a second variable ($Y_r$) so as to generate a second intermediate signal. The adder 673 is coupled electrically to the first and second variable gain stages 671, 672 for combining the first and second intermediate signals therefrom so as to generate the first base band output signal ($BBI_r$). The compensating unit 67 outputs the second base band signal from the second analog-to-digital converter 66 as the second base band output signal ($BBQ_r$).

The detecting unit 68 is coupled electrically to the compensating unit 67 for generating the detection signal that represents an extent of local oscillation leakage and/or an extent of I/Q mismatch from the first and second base band output signals ($BBI_r$, $BBQ_r$). In this embodiment, the detecting unit 68 includes a fast Fourier transformer 681 that performs fast Fourier transform upon the first and second base band output signals ($BBI_r$, $BBQ_r$) from the compensating unit 67 to generate a detection signal that represents an extent of local oscillation leakage and/or an extent of I/Q mismatch. In particular, the fast Fourier transformer 681 treats the first and second base band output signals ($BBI_r$, $BBQ_r$) as a complex signal ($BBI_r + j \times BBQ_r$). If an ideal analog radio frequency signal does not have local oscillation leakage and/or I/Q mismatch, e.g., when the analog radio frequency signal is generated by a transmitter capable of reducing local oscillation leakage and/or I/Q mismatch such as the transmitter of the preferred embodiment, and when the first and second base band output signals ($BBI_r$, $BBQ_r$) are sinusoidal signals with frequencies of ($F_{BB}$), the first and second base band output signals ($BBI_r$, $BBQ_r$) have spectral components at DC (due to local oscillation leakage) and ($-F_{BB}$) (due to I/Q mismatch). In addition, spectral analysis of the first and second base band output signals ($BBI_r$, $BBQ_r$) reveals the extents of local oscillation leakage and I/Q mismatch.

The adjusting unit 69 is coupled electrically to the first and second mixers 61, 62 and the first and second variable gain stages 671, 672 of the compensating unit 67 for respectively outputting first to fourth control signals I(n), Q(n), X(n), Y(n) thereto to respectively control current operating states of the first and second mixers 61, 62 and the first and second variables ($X_r$, $Y_r$) of the first and second variable gain stages 671, 672, i.e., a current operating state of the compensating unit 67.

Since operation of the adjusting unit 69 is similar to that of the adjusting unit 49 (as shown in FIG. 4), further details of the same are omitted herein for the sake of brevity.

It should be noted herein that since each of the adjusting unit 49 of the transmitter and the adjusting unit 69 of the receiver according to the preferred embodiment of the present invention is capable of receiving the detection signal that represents the extents of local oscillation leakage and/or I/Q mismatch and that are presented digitally, the present invention is easy to implement.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A receiver comprising:
a mixer for mixing a radio frequency signal and a local oscillator signal so as to generate a base band signal;
a low pass filter coupled electrically to the mixer for receiving the base band signal therefrom and for performing low pass filtering upon the base band signal;
an analog-to-digital converter coupled electrically to the low pass filter for receiving and converting an output of the low pass filter into a corresponding digital signal;
a detecting unit for generating from the base band signal a detection signal that represents an extent of local oscillation leakage or in-phase/quadrature-phase (I/Q) mismatch, wherein the detecting unit includes a fast Fourier transformer for performing fast Fourier transform upon the output of the analog-to-digital converter so as to generate the detection signal; and an adjusting unit coupled electrically to said mixer for outputting a control signal thereto to control a current operating state of said mixer, said adjusting unit being further coupled electrically to said detecting unit, and determining whether there is a reduction in the extent of local oscillation leakage or I/Q mismatch based on the detection signal from said detecting unit;

wherein said adjusting unit maintains an adjusting direction for the control signal upon determining that the extent of local oscillation leakage or I/Q mismatch is reduced, reverses the adjusting direction upon determining that the extent of local oscillation leakage or I/Q mismatch is not reduced, and adjusts the control signal according to the adjusting direction.

2. The receiver as claimed in claim 1, wherein said mixer is operable in a plurality of operating states that respectively correspond to a plurality of extents of local oscillation leakage or I/Q mismatch.

3. The receiver as claimed in claim 1, wherein the control signal is adjusted stepwise by said adjusting unit.

4. The receiver as claimed in claim 1, wherein said adjusting unit further determines if a termination condition is satisfied, and repeats the determination as to whether there is a reduction in the extent of local oscillation leakage or I/Q mismatch and the adjustment of the control signal upon determining that the termination condition is not satisfied.

5. The receiver as claimed in claim 4, wherein said adjusting unit determines the termination condition to be satisfied when said adjusting unit has repeated the determination as to whether there is a reduction in the extent of local oscillation leakage or I/Q mismatch and the adjustment of the control signal for a predefined number of times.

6. The receiver as claimed in claim 4, wherein said adjusting unit determines the termination condition to be satisfied when the extent of local oscillation leakage or I/Q mismatch is determined thereby to be smaller than a predefined threshold.

7. A receiver comprising:

a mixer for mixing a radio frequency signal and a local oscillator signal so as to generate a base band signal;

a low pass filter coupled electrically to the mixer for receiving the base band signal therefrom and for performing low pass filtering upon the base band signal;

an analog-to-digital converter coupled electrically to the low pass filter for receiving and converting an output of the low pass filter into a corresponding digital signal;

a detecting unit for generating from the base band signal a detection signal that represents an extent of local oscillation leakage or in-phase/quadrature-phase (I/Q) mismatch, wherein the detecting unit includes a Fourier-based transformer for performing a Fourier-based transform upon the output of the analog-to-digital converter so as to generate the detection signal; and an adjusting unit coupled electrically to said mixer for outputting a control signal thereto to control a current operating state of said mixer, said adjusting unit being further coupled electrically to said detecting unit, and determining whether there is a reduction in the extent of local oscillation leakage or I/Q mismatch based on the detection signal from said detecting unit;

wherein said adjusting unit maintains an adjusting direction for the control signal upon determining that the extent of local oscillation leakage or I/Q mismatch is reduced, reverses the adjusting direction upon determining that the extent of local oscillation leakage or I/Q mismatch is not reduced, and adjusts the control signal according to the adjusting direction.

* * * * *